United States Patent

Yamamoto

(10) Patent No.: US 10,942,435 B2
(45) Date of Patent: Mar. 9, 2021

(54) LIGHT EMISSION CONTROL DEVICE, LIGHT SOURCE DEVICE, AND PROJECTION-TYPE VIDEO DISPLAY APPARATUS

(71) Applicant: SEIKO EPSON CORPORATION, Tokyo (JP)

(72) Inventor: Yuki Yamamoto, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/801,306

(22) Filed: Feb. 26, 2020

(65) Prior Publication Data

US 2020/0272040 A1 Aug. 27, 2020

(30) Foreign Application Priority Data

Feb. 27, 2019 (JP) .............................. JP2019-033688

(51) Int. Cl.
*G03B 21/20* (2006.01)
*H04N 9/31* (2006.01)

(52) U.S. Cl.
CPC ..... *G03B 21/2053* (2013.01); *G03B 21/2013* (2013.01); *G03B 21/2033* (2013.01); *H04N 9/3155* (2013.01)

(58) Field of Classification Search
CPC ............ G03B 21/2053; G03B 21/2033; H04N 9/3155; H05B 47/14
USPC ....................................................... 315/291
See application file for complete search history.

(56) References Cited

U.S. PATENT DOCUMENTS

| 2004/0124889 | A1 | 7/2004 | Koharagi et al. |
| 2016/0353533 | A1 | 12/2016 | Gyoten et al. |
| 2018/0180978 | A1 | 6/2018 | Yamada et al. |
| 2019/0239300 | A1* | 8/2019 | Yamada ............... H05B 45/325 |

FOREIGN PATENT DOCUMENTS

| JP | 2004-147435 A | 5/2004 |
| JP | 2016-225285 A | 12/2016 |
| JP | 2017-142115 A | 8/2017 |
| JP | 2018-106862 A | 7/2018 |

* cited by examiner

*Primary Examiner* — Ryan D Howard
(74) *Attorney, Agent, or Firm* — Oliff PLC

(57) ABSTRACT

A light emission control device includes a first detection circuit, a second detection circuit, and a light emission control circuit. The first detection circuit detects a first potential difference that is a potential difference between both ends of a first resistor. The second detection circuit detects a second potential difference that is a potential difference between both ends of a second resistor. The light emission control circuit outputs a first control signal for controlling turning on/off of the first switching element and a second control signal for controlling turning on/off of the second switching element. The light emission control circuit performs a stop process of making at least one of the first control signal and the second control signal inactive, when the first potential difference is detected to be smaller than a first threshold value and the second potential difference is detected to be larger than a second threshold value.

13 Claims, 13 Drawing Sheets

ERQ

SS

DETB

LIGHT EMISSION CONTROL DEVICE, LIGHT SOURCE DEVICE, AND PROJECTION-TYPE VIDEO DISPLAY APPARATUS

The present application is based on, and claims priority from JP Application Serial Number 2019-033688, filed Feb. 27, 2019, the disclosure of which is hereby incorporated by reference herein in its entirety.

BACKGROUND

1. Technical Field

The present disclosure relates to a light emission control device, a light source device, a projection-type video display apparatus, and the like.

2. Related Art

Alight emission control device that controls a light source used in a projector or the like is known. The light emission control device performs switching regulation control by controlling turning on and off of a transistor that causes a current to flow through an inductor, and controls a light emission amount of a light emission element by causing a constant current obtained by the switching regulation control to flow through the light emission element. In this case, the light emission control device detects the current flowing through the light emission element and the current flowing through the transistor for the switching regulation, and performs the switching regulation control based on these currents. The related art of such a light emission control device is disclosed, for example, in JP-A-2018-106862.

The light emission control device performs overcurrent detection in order to avoid an abnormality or failure due to an overcurrent. In the past, the overcurrent detection for the current flowing through the light emission element and the overcurrent detection for the current flowing through the transistor for the switching regulation were performed, and detection results thereof were individually used to deal with the overcurrent. However, there is a problem that the overcurrent may not be appropriately dealt with only by individually using the detection results.

SUMMARY

An aspect of the present disclosure relates to a light emission control device for controlling a first switching element and a second switching element of a light source circuit including a light emission element, a first resistor, and the first switching element provided in series between a first power source node and a first node, and an inductor, the second switching element, and a second resistor provided in series between the first node and a second power source node, the device including: a first detection circuit detecting a first potential difference that is a potential difference between both ends of the first resistor; a second detection circuit detecting a second potential difference that is a potential difference between both ends of the second resistor; and a light emission control circuit outputting a first control signal for controlling turning on/off of the first switching element and a second control signal for controlling turning on/off of the second switching element. The light emission control circuit performs a stop process of making at least one of the first control signal and the second control signal inactive, when the first detection circuit detects that the first potential difference is smaller than a first threshold value and the second detection circuit detects that the second potential difference is larger than a second threshold value.

DESCRIPTION OF EXEMPLARY EMBODIMENTS

Hereinafter, preferred embodiments of the present disclosure will be described in detail. In addition, the embodiments described below do not unduly limit the contents described in the appended claims, and all the configurations described in the embodiments are not necessarily essential constituent elements.

1. Light Source Device and Light Emission Control Device

Figure 1:
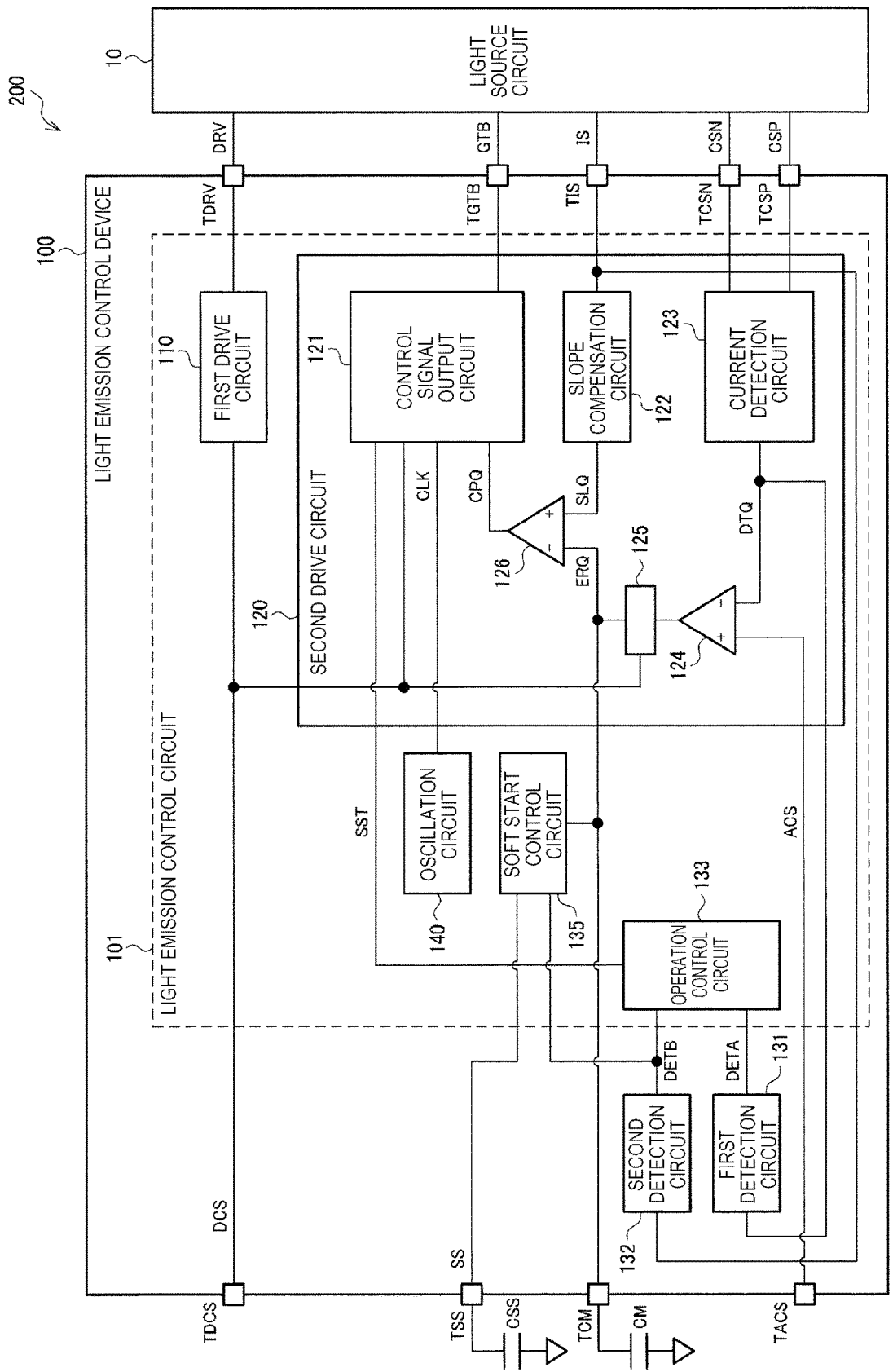
FIG. 1 is a configuration example of a light source device.
Figure 2:
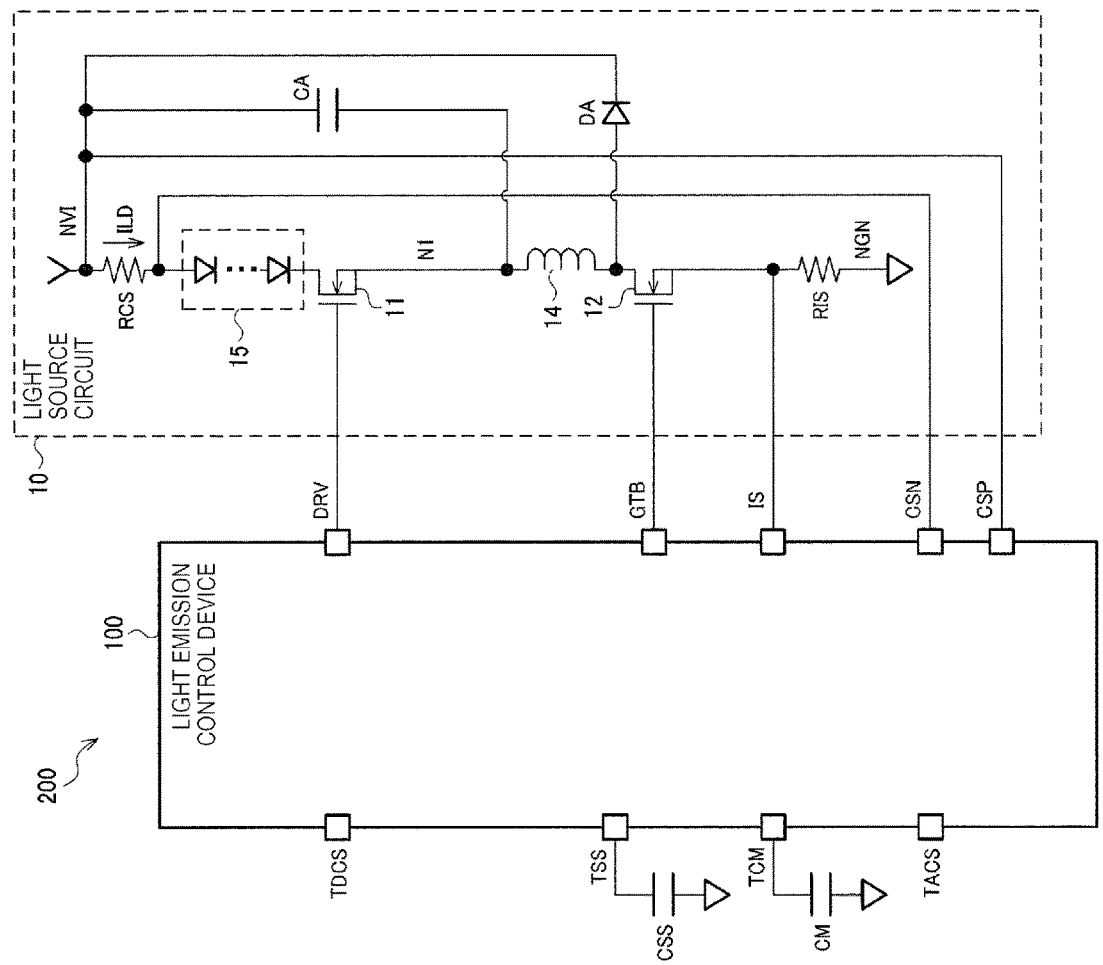
FIG. 2 is a configuration example of the light source device.

FIGS. 1 and 2 are a configuration example of a light source device 200. The light source device 200 includes alight source circuit 10 that is a light emission element and a peripheral circuit thereof, and a light emission control device 100 that controls light emission of the light emission element. The light emission control device 100 is, for example, an integrated circuit device, and is realized by, for example, a semiconductor chip.

First, configurations of the light source circuit 10 and the light emission control device 100 will be described with reference to FIGS. 1 and 2, and a PWM dimming mode and an analog dimming mode will be described with reference to FIGS. 3 and 4. Thereafter, overcurrent detection will be described with reference to FIG. 5 or later.

As illustrated in FIG. 2, the light source circuit 10 includes a first switching element 11, a second switching element 12, an inductor 14, and a light emission element 15. The light source circuit 10 includes a first resistor RCS, a second resistor RIS, a capacitor CA, and a diode DA. Although FIG. 1 illustrates a case in which the first switching element 11 and the second switching element 12 are N-type transistors, these switching elements are not limited to the N-type transistors.

The light emission element 15 is driven by a current ILD, and emits light with brightness according to a current value of the current ILD. The light emission element 15 is a plurality of laser diodes coupled in series with each other. However, the light emission element 15 may be a single laser diode or a light emitting diode (LED).

The light emission element 15 and the first switching element 11 are provided in series between a first power source node NVI and a first node N1. The first node N1 is a node coupled to one end of the inductor 14. The inductor 14, the second switching element 12, and the second resistor RIS are provided in series between the first node N1 and a second power source node NGN. Specifically, the first resistor RCS is coupled between the first power source node NVI and one end of the light emission element 15, the other end of the light emission element 15 is coupled to a drain of the first switching element 11, and a source of the first switching element 11 is coupled to one end of the inductor 14. The other end of the inductor 14 is coupled to a drain of the second switching element 12, and the second resistor RIS is coupled between a source of the second switching element 12 and the second power source node NGN. The first power source node NVI is a node to which a first power source is input, and the second power source node NGN is a node to which a second power source is input. A voltage of the first power source is higher than a voltage of the second power source. The second power source is, for example, a ground. A coupling relationship of the capacitor CA and the diode DA is as illustrated in FIG. 2, and an operation of the light source circuit 10 including these circuit elements will be described later with reference to FIGS. 3 and 4.

The second switching element 12 performs switching regulation control of a current flowing through the inductor 14. The first switching element 11 controls whether or not the current flowing through the inductor 14 flows through the light emission element 15. Although details will be described later, a mode, in which the first switching element 11 is always turned on and a light emission amount of the light emission element 15 is controlled by the switching regulation control of the second switching element 12, is referred to as an analog dimming mode. Further, a mode, in which the light emission amount of the light emission element 15 is controlled by an on-duty when the first switching element 11 is turned on and off, is referred to as a PWM dimming mode.

As illustrated in FIG. 1, the light emission control device 100 includes a light emission control circuit 101, a first detection circuit 131, and a second detection circuit 132. The light emission control device 100 includes a PWM terminal TDCS, a dimming voltage input terminal TACS, and terminals TDRV, TGTB, TIS, TCSP, and TCSN.

A PWM signal DCS used for dimming control in the PWM dimming mode is input from a processing device to the PWM terminal TDCS. A dimming voltage ACS used for dimming control in the analog dimming mode is input from the processing device to the dimming voltage input terminal TACS. The processing device is a host device of the light emission control device 100, and is, for example, a processor such as an MPU or a CPU.

The light emission control circuit 101 dims the light emission amount of the light emission element 15 by performing turning on/off control of the first switching element and the second switching element based on the PWM signal DCS and the dimming voltage ACS. The light emission control circuit 101 includes a first drive circuit 110, a second drive circuit 120, an oscillation circuit 140, a soft start control circuit 135, and an operation control circuit 133.

The first drive circuit 110 outputs a first control signal DRV for controlling turning on or off of the first switching element 11 based on the PWM signal DCS. The first control signal DRV is output from the terminal TDRV and input to the gate of the first switching element 11. The first drive circuit 110 outputs the first control signal DRV for turning on of the first switching element 11 when the PWM signal DCS is active, and outputs the first control signal DRV for turning off of the first switching element 11 when the PWM signal DCS is inactive. The first drive circuit 110 is configured by, for example, a buffer circuit that buffers the PWM signal DCS, or the like.

The oscillation circuit 140 generates the clock signal CLK. For example, the oscillation circuit 140 is a CR oscillation circuit, a ring oscillator, a multivibrator, or the like.

The second drive circuit 120 outputs the second control signal GTB based on the dimming voltage ACS, the PWM signal DCS, and the clock signal CLK. The second control signal GTB is output from the terminal TGTB and input to a gate of the second switching element 12. The second control signal GTB controls turning on/off of the second switching element in a period in which the PWM signal DCS is active. Specifically, the voltage CSP at one end of the first resistor RCS is input to the terminal TCSP, the voltage CSN at the other end of the first resistor RCS is input to the terminal TCSN, and the voltage IS at one end of the second resistor RIS is input to the terminal TIS. The second drive circuit 120 performs switching regulation control on the current ILD flowing through the light emission element 15 based on the voltages CSP, CSN, and IS, and the dimming voltage ACS, thereby performing control to be the current ILD corresponding to the dimming voltage ACS.

The second drive circuit 120 includes a control signal output circuit 121, a slope compensation circuit 122, a current detection circuit 123, an error amplifier circuit 124, a switch circuit 125, and a comparator 126. Hereinafter, an operation of each portion of the second drive circuit 120 and each dimming mode of the first drive circuit 110 will be described with reference to waveform diagrams of FIGS. 3 and 4. In the following, active is set to a high level and inactive is set to a low level.

Figure 3:
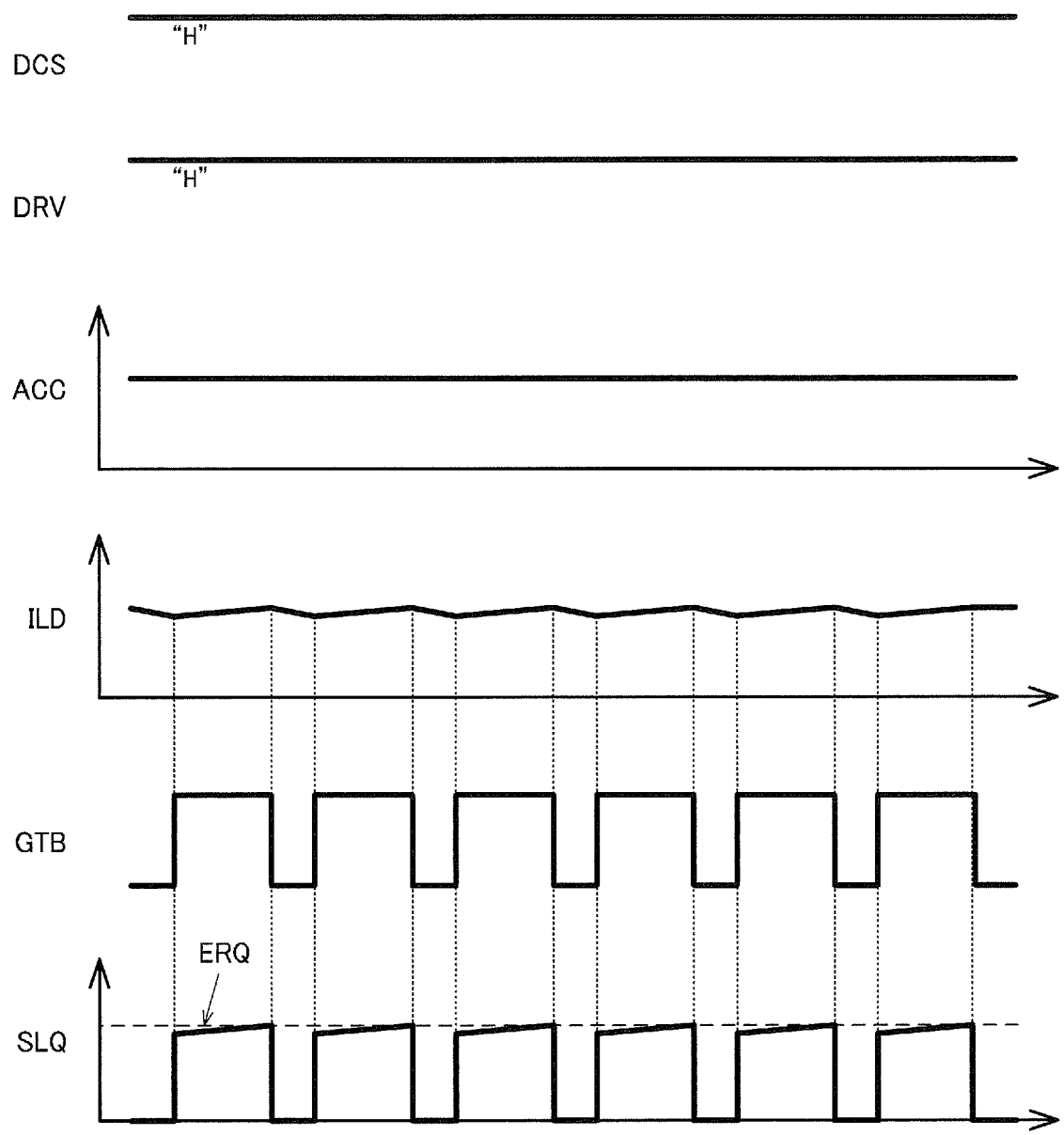
FIG. 3 is a waveform diagram in an analog dimming mode.

FIG. 3 is a waveform diagram in the analog dimming mode. In the analog dimming mode, the PWM signal DCS is at the high level. The first drive circuit 110 always turns on the first switching element 11 by outputting the first control signal DRV of the high level. In the PWM dimming mode, the PWM signal DCS is a rectangular wave having a high width duty less than 100%. Therefore, the PWM signal DCS that is always at the high level in the analog dimming mode is a PWM signal having a high width duty of 100%.

The current detection circuit 123 outputs a detection voltage DTQ by multiplying a potential difference CSP−CSN=RCS×ILD between both ends of the first resistor RCS by a given gain. The error amplifier circuit 124 amplifies an error between the detection voltage DTQ and the dimming voltage ACS. The switch circuit 125 is turned on when the PWM signal DCS is at the high level, and is turned off when the PWM signal DCS is at the low level. In the analog dimming mode, the switch circuit 125 is always turned on.

The slope compensation circuit 122 increases a slope of the voltage IS over time in order to suppress subharmonic oscillation of the drive current flowing through the laser diode, and outputs the voltage SLQ after the increase in the slope. The comparator 126 compares the voltage SLQ with the output voltage ERQ of the error amplifier circuit 124, outputs the signal CPQ of the low level when SLQ<ERQ, and outputs the signal CPQ of the high level when SLQ>ERQ.

The control signal output circuit 121 allows the second control signal GTB to transition from the low level to the high level at an edge of the clock signal CLK. Since the second switching element 12 is turned on when the second control signal GTB is at the high level, a current flows from the inductor 14 to the second power source node NGN via the second switching element 12 and the second resistor RIS. Since the current flowing through the inductor 14 increases, the voltage IS increases and the output voltage SLQ of the slope compensation circuit 122 increases. Since the current flowing through the inductor 14 flows through the light emission element 15 via the first switching element 11, the current ILD flowing through the light emission element 15 also increases.

When SLQ>ERQ, the output signal CPQ of the comparator 126 transitions from the low level to the high level. In this case, the control signal output circuit 121 allows the second control signal GTB to transition from the high level to the low level. When the second control signal GTB is at the low level, the second switching element 12 is turned off, so that a current flows from the inductor 14 to the first power source node NVI via the diode DA. Since the current flowing through the inductor 14 decreases, the current ILD flowing through the light emission element 15 also decreases.

When the detection voltage DTQ that is a detection result of the current ILD is different from the dimming voltage ACS, the output voltage ERQ of the error amplifier circuit 124 changes, so that the duty of the second control signal GTB changes. Thus, the current ILD is feedback-controlled so that the detection voltage DTQ matches the dimming voltage ACS. Such feedback control keeps the current ILD constant. Control for keeping the current ILD constant is called switching regulation control. The current ILD is maintained at a current value corresponding to the dimming voltage ACS, and when the processing device changes the dimming voltage ACS, the current ILD changes accordingly. That is, in the analog dimming mode, the light emission amount of the light emission element 15 is dimmed by the dimming voltage ACS.

The analog dimming mode described above is used from a maximum value of the current ILD to a predetermined value. That is, when the light emission element 15 emits the light with high luminance, the analog dimming mode is used. On the other hand, when the current ILD is less than a predetermined value, that is, when the light emission element 15 emits the light with low luminance, the PWM dimming mode is used.

Figure 4:
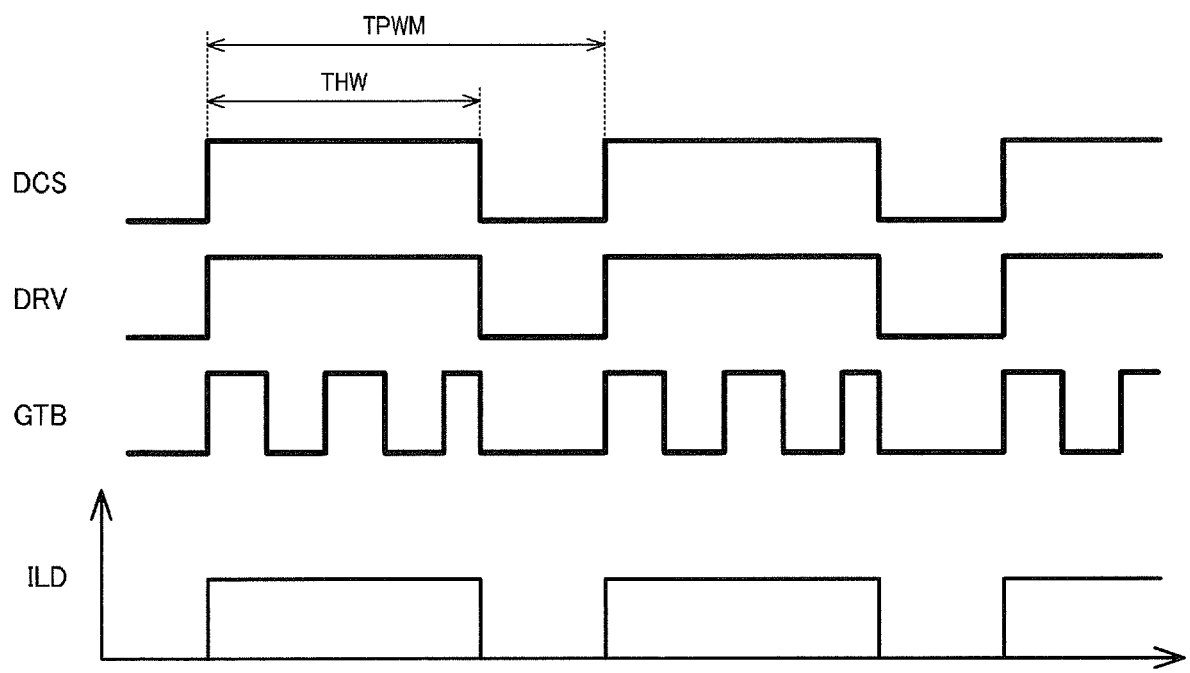
FIG. 4 is a waveform diagram in a PWM dimming mode.

FIG. 4 is a waveform diagram in the PWM dimming mode. The cycle of the PWM signal DCS is TPWM, and the period in which the PWM signal DCS is at the high level is THW. The duty of the PWM signal DCS is (THW/TPWM)× 100%. The frequency of the second control signal GTB is set higher than the frequency of the PWM signal DCS.

When the PWM signal DCS is at the high level, the first drive circuit 110 outputs the first control signal DRV of the high level, and turns on the first switching element 11. In this case, the second drive circuit 120 performs the switching regulation control by switching the second control signal GTB. Therefore, the current ILD corresponding to the dimming voltage ACS flows through the light emission element 15. When the PWM signal DCS is at the low level, the first drive circuit 110 outputs the first control signal DRV of the low level, and turns off the first switching element 11. The second drive circuit 120 sets the second control signal GTB to the low level. In this case, no current flows through the light emission element 15.

Since a time average of the current ILD flowing through the light emission element 15 is determined by the duty of the PWM signal DCS, the light emission amount is also determined by the duty of the PWM signal DCS. Thus, in the PWM dimming mode, the dimming control is performed by the duty of the PWM signal DCS. On the other hand, the current value when the current ILD flows through the light emission element 15 is ensured to be higher than the time average. In order to cause the laser diode to emit light, it is necessary for the current ILD of a threshold value or more to flow through the laser diode. By performing the PWM control as described above, it is possible to cause the laser diode to emit light by causing the current ILD of the threshold value or more to flow, and to perform dimming as the time average.

2. Overcurrent Detection

Next, overcurrent detection will be described. First, a comparative example will be described, and then the overcurrent detection of the present embodiment will be described.

In the comparative example, it is determined that whether or not an overcurrent has flowed through the light emission element 15 based on a potential difference (CSP−CSN) between both ends of the first resistor RCS. When it is determined that the overcurrent has flowed through the light emission element 15, the second drive circuit 120 turns off the second switching element 12 by causing the second control signal GTB to be inactive. Therefore, a current path is interrupted, so that no current flows through the light emission element 15.

In the comparative example, it is determined whether or not an overcurrent has flowed through the second switching element 12 based on the voltage IS at one end of the second resistor RIS. When it is determined that the overcurrent has flowed through the second switching element 12, the second drive circuit 120 restarts the switching regulation control. In the restart, the soft start that gradually increases the on-duty of the second switching element 12 is performed. Therefore, the overcurrent is suppressed. As will be described later, a large current may flow through the second switching element 12 even at the normal time. Therefore, even if the overcurrent of the second switching element 12 is detected, the switching regulation control is restarted without being stopped.

In the comparative example described above, results of two overcurrent detections are individually used. However, there is a case in which it is not possible to appropriately deal with the overcurrent only by using the detection results individually. Specifically, when the both ends of the first resistor RCS are short-circuited, a current flows through a path due to the short circuit, so that the potential difference between the both ends of the first resistor RCS is small. Therefore, the current detection circuit 123 erroneously determines that the current flowing through the light emission element 15 is small, and the second drive circuit 120 increases the current flowing through the light emission element 15. That is, even if a large current actually flows through the light emission element 15, the current of the light emission element 15 is further increased, and the current or the light emission amount may exceed the rating. In this case, since the voltage IS at one end of the second resistor RIS increases, the overcurrent is detected, but the switching regulation control is restarted without being stopped. Even after the restart, since a large current flows through the light emission element 15 due to the short circuit, the restart is repeated, and the light emission exceeding the rating may be repeated.

In the present embodiment, a first potential difference that is a potential difference between the both ends of the first resistor RCS and a second potential difference that is a potential difference between the both ends of the second resistor RIS are detected, and the overcurrent can be appropriately dealt with by combining these detection results thereof. This will be described in detail below.

The overcurrent detection performed by the light emission control device 100 will be described with reference to FIGS. 1 and 2. As illustrated in FIG. 1, the first detection circuit 131 detects the first potential difference that is the potential difference (CSP−CSN) between the both ends of the first resistor RCS. Specifically, the first detection circuit 131 detects whether or not the first potential difference is smaller than a first threshold value, and outputs a detection signal DETA that is a result thereof. The first threshold value is a threshold value for detecting the short circuit between the both ends of the first resistor RCS, and is set to a value sufficiently smaller than the current ILD at the normal time. That is, the first threshold value is a value smaller than a minimum value of the current ILD at the normal time, and is set to, for example, ½ or less of the minimum value.

The short circuit means that an abnormal current path is generated other than to a normal current path. That is, the short circuit between the both ends of the resistor means that the abnormal current path that couples the both ends of the resistor is generated due to adhesion of metal, dust or the like, or mounting failure. Since a current path is generated in parallel with the resistor due to the short circuit, the resistance value is apparently lowered. The apparent resistance value is not limited to zero Ω, and a case in which the apparent resistance value is larger than zero Ω is also included in the short circuit.

The second detection circuit 132 detects the voltage IS at one end of the second resistor RIS, thereby detecting the second potential difference that is a potential difference between the both ends of the second resistor RIS. Specifically, the second detection circuit 132 detects whether or not the second potential difference is smaller than the second threshold value, and outputs a detection signal DETB that is a result thereof. The second threshold value is a threshold value for detecting the overcurrent of the second switching element 12. The second threshold value is set to a value sufficiently larger than the current flowing through the second switching element 12 in the steady state of the switching regulation control. That is, the second threshold value is set to a value larger than the maximum value of the current flowing through the second switching element 12 in a state in which the on-duty of the second switching element 12 is stable without changing.

The potential difference may not be necessarily detected by monitoring the voltage at the both ends of the resistor. That is, when one end of the resistor has a constant voltage, the potential difference can be detected by monitoring the voltage at the other end of the resistor. Specifically, in FIG. 2, the voltage IS is a ground-reference voltage. It is possible to detect a potential difference between the both ends of the second resistor RIS by monitoring the voltage IS.

When it is detected that the first potential difference is smaller than the first threshold value and it is detected that the second potential difference is larger than the second threshold value, the light emission control circuit 101 causes at least one of the first control signal DRV and the second control signal GTB to be inactive. This process is called a stop process. Specifically, when the first potential difference is smaller than the first threshold value, the first detection circuit 131 outputs an active detection signal DETA, and when the second potential difference is larger than the second potential difference, the second detection circuit 132 outputs an active detection signal DETB. The operation control circuit 133 outputs an active stop signal SST when both DETA and DETB are active. The control signal output circuit 121 outputs an inactive second control signal GTB when the stop signal SST is active. Therefore, since the second switching element 12 is turned off, the current flowing through the light emission element 15 stops.

The stop signal SST may be input to the first drive circuit 110. In that case, the first drive circuit 110 outputs the inactive first control signal DRV when the stop signal SST is active. Therefore, since the first switching element 11 is turned off, the current flowing through the light emission element 15 stops.

When the both ends of the first resistor RCS are short-circuited, the potential difference between the both ends of the first resistor RCS is small, and the potential difference between the both ends of the second resistor RIS is large. According to the present embodiment, when the potential difference between the both ends of the first resistor RCS is smaller than the first threshold value and the potential difference between the both ends of the second resistor RIS is larger than the second threshold value, the current flowing through the light emission element 15 can be stopped. That is, it is possible to prevent an excessive current from flowing through the light emission element 15 when the both ends of the first resistor RCS are short-circuited.

In the present embodiment, the light emission control circuit 101 performs a restart process to increase the current after stopping the current flowing through the second switching element 12 when it is detected that the second potential difference is larger than the second threshold value. Specifically, when the detection signal DETB changes from inactive to active, the soft start control circuit 135 performs the soft start process. That is, the soft start control circuit 135 once decreases the output voltage ERQ of the error amplifier circuit 124 and then gradually increases the output voltage ERQ. As described with reference to FIG. 3, the duty of the second control signal GTB is determined by ERQ. Therefore, when the output voltage ERQ decreases, the second control signal GTB is inactive and the second switching element 12 is turned off. As the output voltage ERQ gradually increases, the duty of the second control signal GTB gradually increases. Although the current flowing through the second switching element 12 is turned on and off, when it is averaged over time, the current increases as the on-duty gradually increases.

As will be described later, at the normal time, that is, when the both ends of the first resistor RCS are not short-circuited, the potential difference between the both ends of the second resistor RIS may be larger than the second threshold value. When it is detected that the potential difference between the both ends of the second resistor RIS is larger than the second threshold value, the restart process is performed, so that it is possible to return to the normal switching regulation control while suppressing the overcurrent at the normal time.

Figure 5:
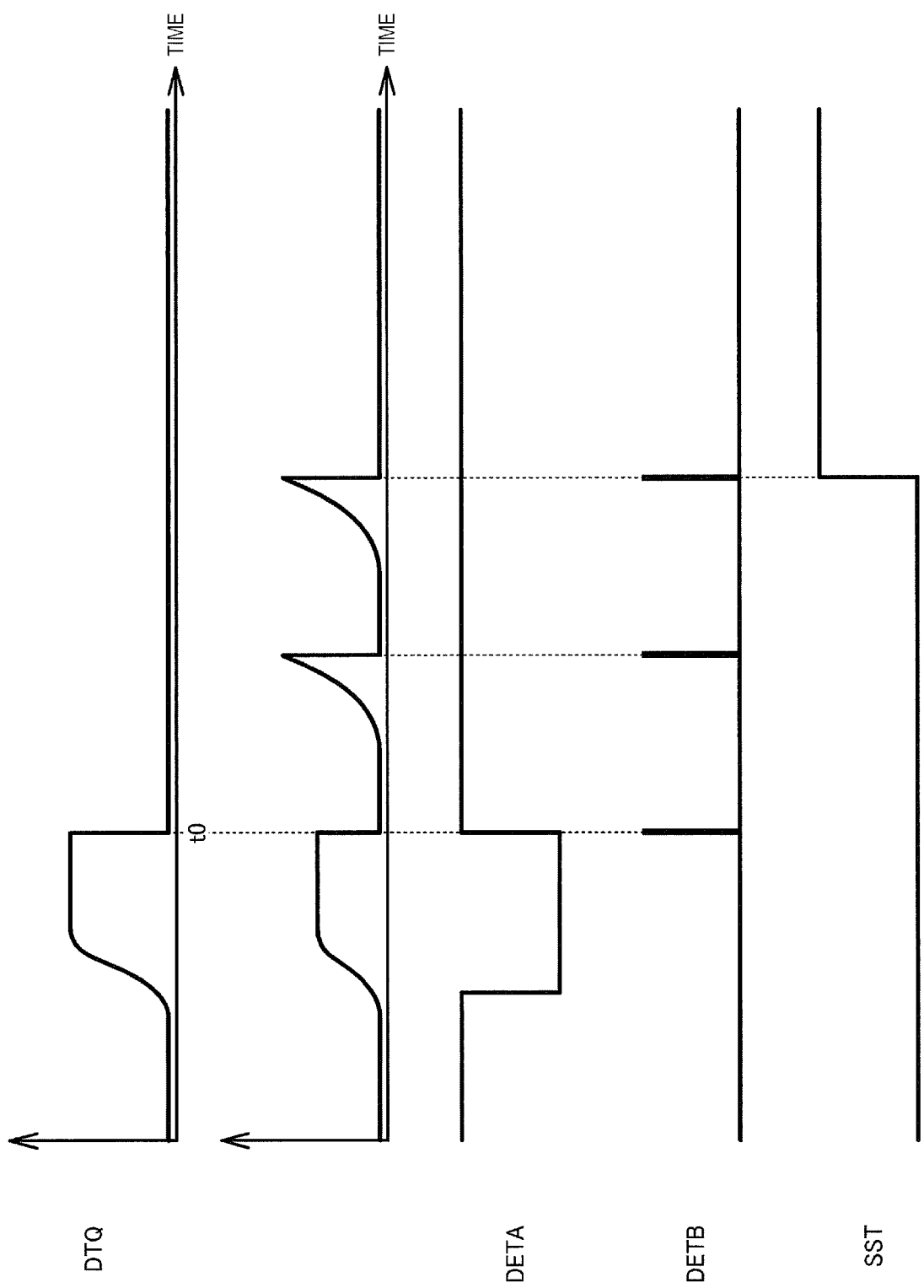
FIG. 5 is a waveform diagram for explaining a stop process.

In the present embodiment, the light emission control circuit 101 performs the stop process after the restart process. Specifically, the light emission control circuit 101 performs the stop process when the restart process is performed a predetermined number of times of twice or more. FIG. 5 illustrates a waveform diagram for explaining the process. In the following description, the high level is active and the low level is inactive, but the correspondence between active and a logical level is not limited to the example.

As illustrated in FIG. 5, when the both ends of the first resistor RCS are not short-circuited, the current ILD increases due to the soft start, and the detection voltage DTQ of the current detection circuit 123 increases, accordingly. The first detection circuit 131 changes the detection signal DETA from the high level to the low level when the detection voltage DTQ is larger than the first threshold value.

It is assumed that the both ends of the first resistor RCS are short-circuited at time t0. When the detection voltage DTQ decreases due to the short circuit and is smaller than the first threshold value, the first detection circuit 131 changes the detection signal DETA from the low level to the high level.

When the detection voltage DTQ decreases, the second drive circuit 120 increases the current ILD flowing through the light emission element 15, thereby increasing the on-duty of the second switching element 12. Therefore, since the current flowing through the second resistor RIS increases, when the potential difference between the both ends of the second resistor RIS is larger than the second threshold value, the second detection circuit 132 changes the detection signal DETB from the low level to the high level.

When the detection signal DETB is at the high level, the soft start control circuit 135 performs the soft start, so that the on-duty of the second switching element 12 decreases and the current ILD flowing through the light emission element 15 decreases. Further, the detection signal DETB changes from the high level to the low level.

Since the both ends of the first resistor RCS are short-circuited after time t0, the detection voltage DTQ of the current detection circuit 123 remains low, and the detection signal DETA is maintained at the low level. Further, although the current ILD flowing through the light emission element 15 gradually increases due to the soft start, since the detection voltage DTQ of the current detection circuit 123 remains low, the second drive circuit 120 determines that the current ILD remains small, and the on-duty of the second switching element 12 continuously increases. Then, since the potential difference between the both ends of the second resistor RIS is larger than the second threshold value again, the second detection circuit 132 changes the detection signal DETB from the low level to the high level, and the soft start control circuit 135 performs the soft start. Thereafter, the same operation is repeated.

When DETA=L and when a rising edge of DETB generates three times, the operation control circuit 133 changes the stop signal SST from the low level to the high level. When the stop signal SST is at the high level, the second drive circuit 120 causes the second switching element 12 to be turned off by setting the second control signal GTB to the low level. In FIG. 5, the predetermined number of times is three, but the number of times is not limited to the example, and the predetermined number may be two or more.

In FIG. 5, the detection signal DETB becomes the high level because the both ends of the first resistor RCS are short-circuited, but as will be described later, the detection signal DETB may become the high level one or more times even at the normal time. According to the present embodiment, since the stop process is performed when the restart process is performed a predetermined number of times of 2 or more by the soft start, it is possible to prevent the stop process from being executed at the normal time. The predetermined number of times may be set to a number larger than the number of times that the detection signal DETB becomes the high level at the normal time.

3. Detailed Configuration Example

Figure 6:
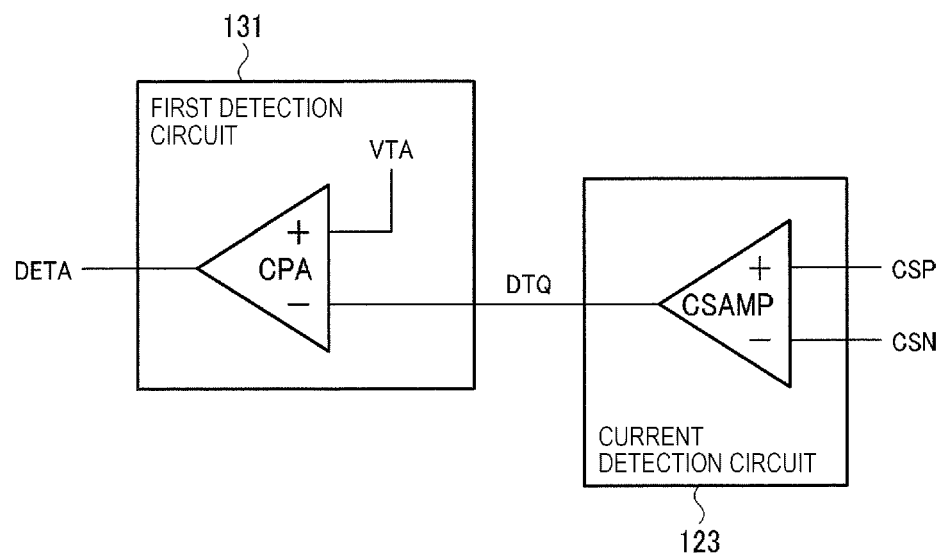
FIG. 6 is a detailed configuration example of a current detection circuit and a first detailed configuration example of a first detection circuit.

FIG. 6 is a detailed configuration example of the current detection circuit 123 and a first detailed configuration example of the first detection circuit 131. The current detection circuit 123 includes a differential input single-ended output amplifier circuit CSAMP. The amplifier circuit CSAMP amplifies the potential difference (CSP−CSN) input to the current detection circuit 123 with a predetermined gain, and outputs the amplified voltage as the detection voltage DTQ.

The first detection circuit 131 includes a comparator CPA. The comparator CPA compares the detection voltage DTQ with a reference voltage VTA and outputs the detection signal DETA as a result thereof. The reference voltage VTA corresponds to the first threshold value. The comparator CPA outputs DETA=L when DTQ>VTA, and outputs DETA=H when DTQ<VTA.

Figure 7:
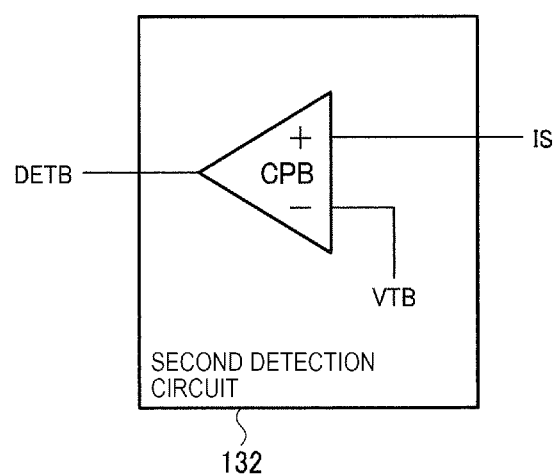
FIG. 7 is a detailed configuration example of a second detection circuit.

FIG. 7 is a detailed configuration example of the second detection circuit 132. The second detection circuit 132 includes a comparator CPB. The comparator CPB compares the voltage IS at one end of the second resistor RIS with a reference voltage VTB and outputs the detection signal DETB that is a result thereof. The reference voltage VTB corresponds to the second threshold value. The comparator CPB outputs DETB=L when IS<VTB, and outputs DETB=H when IS>VTB.

Figure 8:
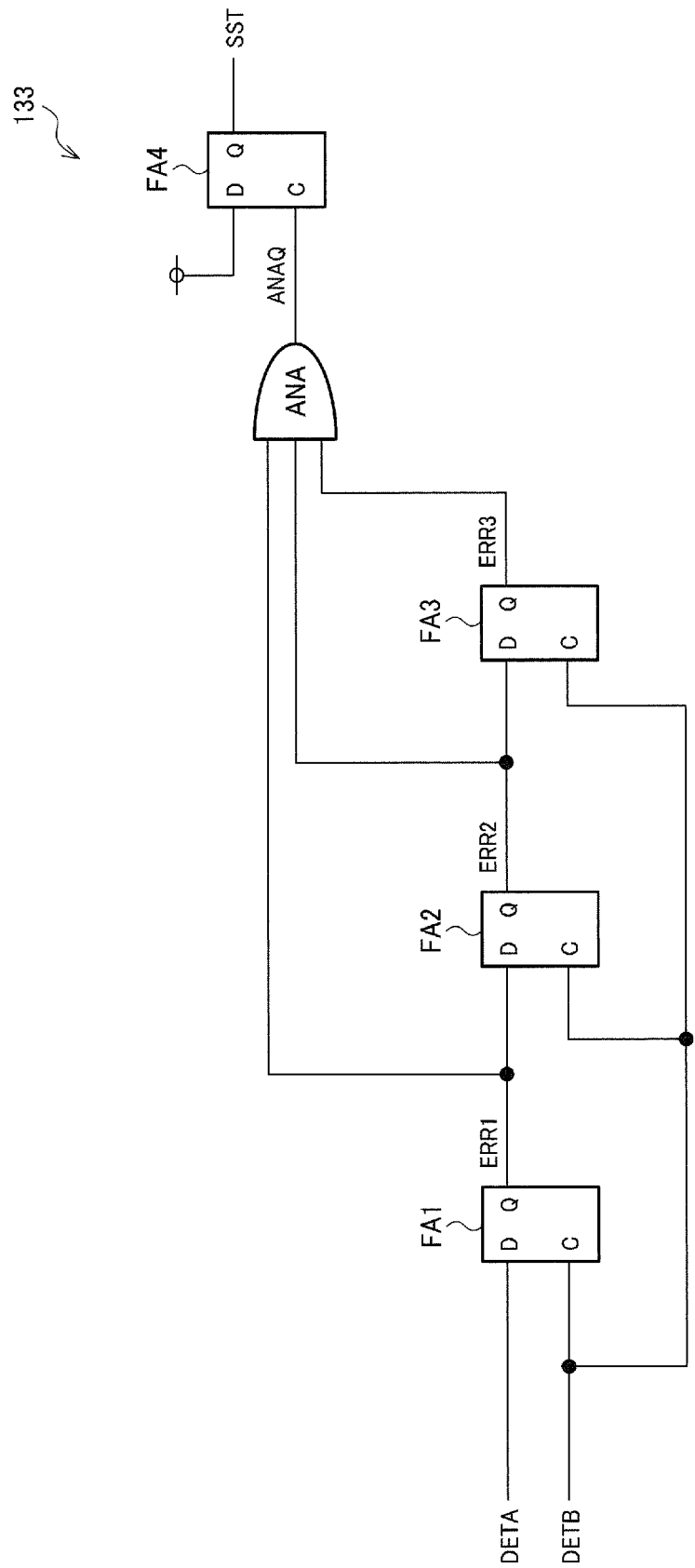
FIG. 8 is a detailed configuration example of an operation control circuit.

FIG. 8 is a detailed configuration example of the operation control circuit 133. The operation control circuit 133 includes latch circuits FA1 to FA4 and an AND circuit ANA. Hereinafter, an operation of the operation control circuit 133 will be described with reference to FIG. 5.

The latch circuits FA1 to FA4 are, for example, dynamic flip-flop circuits. The detection signal DETB is input to clock terminals of the latch circuits FA1 to FA3. At time t0 in FIG. 5, the detection signal DETA becomes the high level. The latch circuit FA1 takes the detection signal DETA of the high level at the rising edge of the detection signal DETB. Therefore, an output signal ERR1 of the latch circuit FA1 changes from the low level to the high level. Similarly, the latch circuit FA2 takes the output signal ERR1 of the high level at a rising edge of a second detection signal DETB. Therefore, an output signal ERR2 of the latch circuit FA2 changes from the low level to the high level. The latch circuit FA3 takes the output signal ERR2 of the high level at a rising edge of a third detection signal DETB. Therefore, an output signal ERR3 of the latch circuit FA3 changes from the low level to the high level.

The AND circuit ANA outputs a logical product of the output signals ERR1 to ERR3. When all of the output signals ERR1 to ERR3 become the high level, that is, at the rising edge of the third detection signal DETB in FIG. 5, the output signal ANAQ of the AND circuit ANA changes from the low level to the high level.

The output signal ANAQ of the AND circuit ANA is input to a clock terminal of the latch circuit FA4. The latch circuit FA4 takes the high level at the rising edge of the output signal ANAQ. Therefore, the stop signal SST output from the latch circuit FA4 changes from the low level to the high level. As described above, the stop signal SST changes from the low level to the high level at the rising edge of the third detection signal DETB.

In the above, the first detection circuit 131 detects whether or not the first potential difference, which is the potential difference between the both ends of the first resistor RCS, is smaller than the first threshold value, and the first detection circuit 131 may further detect whether or not the first potential difference is larger than a third threshold value. When it is detected that the first potential difference is larger than the third threshold value, the light emission control circuit 101 determines that the overcurrent has flowed through the light emission element 15, and at least one of the first control signal DRV and the second control signal GTB may be inactive.

In this way, it is possible to detect the overcurrent flowing through the light emission element 15 even at the normal time when the both ends of the first resistor RCS are not short-circuited. Since at least one of the first switching element 11 and the second switching element 12 is turned off when the overcurrent is detected, the current path of the overcurrent can be interrupted.

Figure 9:
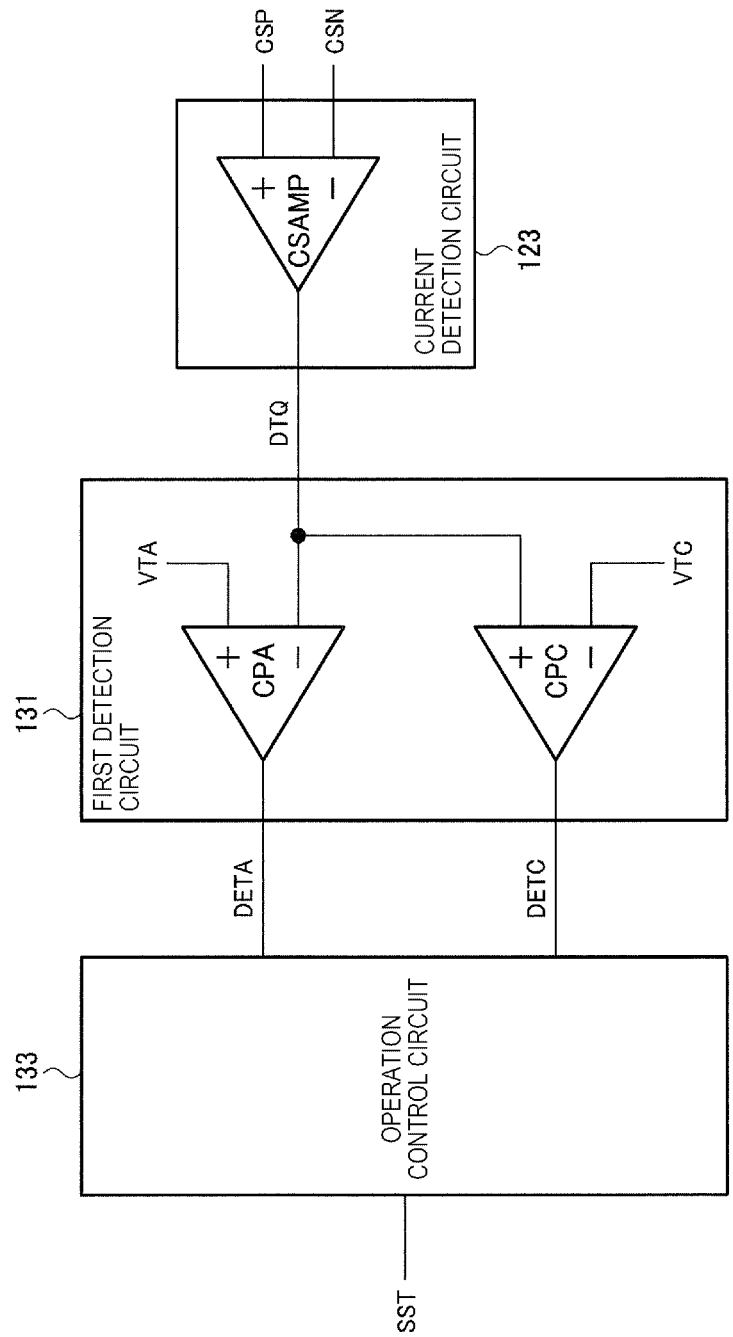
FIG. 9 is a second detailed configuration example of the first detection circuit.

Hereinafter, a configuration example when the detection is performed will be described. FIG. 9 is a second detailed configuration example of the first detection circuit 131.

In FIG. 9, the first detection circuit 131 further includes a comparator CPC. The comparator CPC compares the detection voltage DTQ with a reference voltage VTC and outputs a detection signal DETC that is a result thereof. The reference voltage VTC corresponds to the third threshold value. The comparator CPC outputs DETC=L when DTQ<VTC, and outputs DETC=H when DTQ>VTC.

Figure 10:
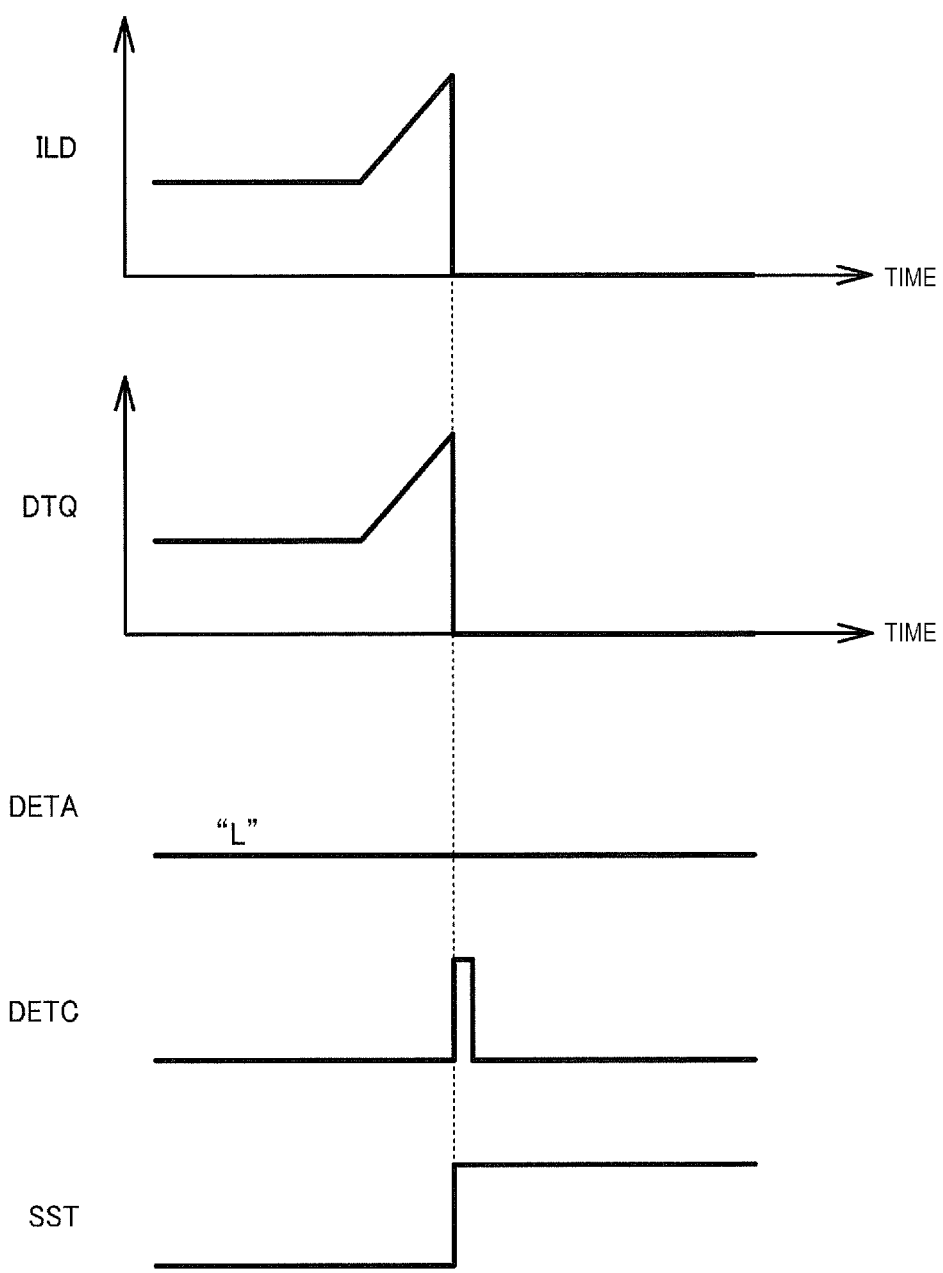
FIG. 10 is a waveform diagram for explaining an operation of the second detailed configuration example of the first detection circuit.

FIG. 10 is a waveform diagram for explaining an operation of the first detection circuit 131 of FIG. 9. Here, DETA=L. When the current ILD flowing through the light emission element 15 increases due to some abnormality, the detection voltage DTQ of the current detection circuit 123 increases. When the detection voltage DTQ is larger than the reference voltage VTC, the detection signal DETC changes from the low level to the high level. The operation control circuit 133 changes the stop signal SST from the low level to the high level when the detection signal DETC changes from the low level to the high level. Since no current flows through the light emission element 15, the detection signal DETC returns to the low level, but the stop signal SST is maintained at the high level. For example, a logical sum of the output signal ANAQ of the AND circuit ANA of FIG. 8 and the detection signal DETC may be input to the clock terminal of the latch circuit FA4.

4. Soft Start Control Circuit

Figure 11:
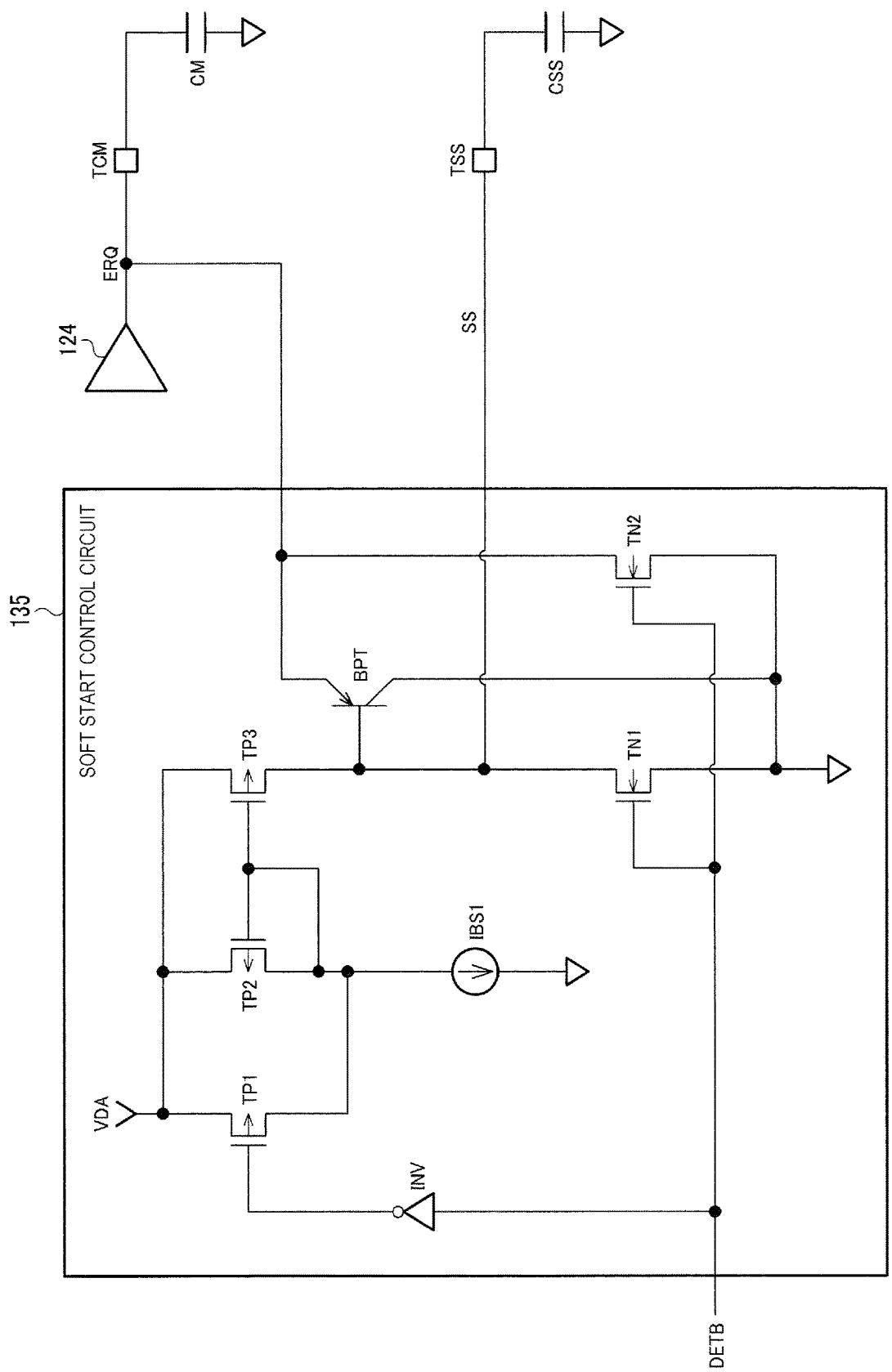
FIG. 11 is a detailed configuration example of a soft start control circuit.

A configuration and an operation of the soft start control circuit 135 will be described. FIG. 11 is a detailed configuration example of the soft start control circuit 135.

The soft start control circuit 135 includes P-type transistors TP1 to TP3, N-type transistors TN1 and TN2, a bipolar transistor BPT, an inverter INV, and a current source IBS1.

Figure 12:
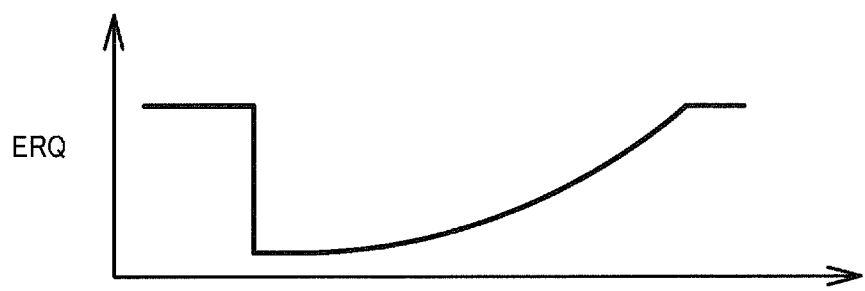
FIG. 12 is a waveform diagram for explaining an operation of the soft start control circuit.
Figure 12:
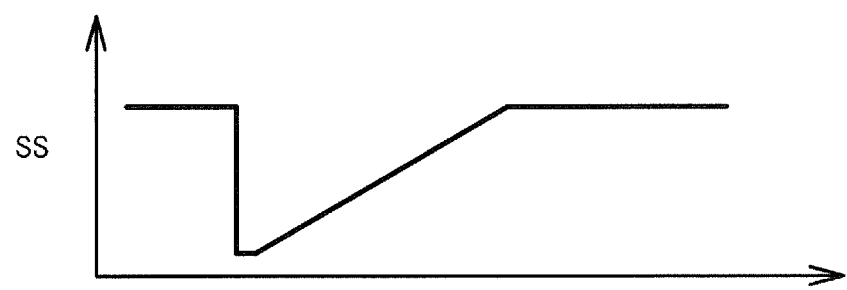
Figure 12:
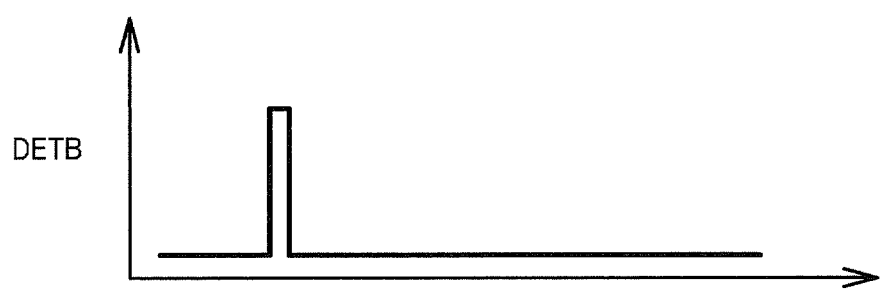

FIG. 12 is a waveform diagram for explaining an operation of the soft start control circuit 135. When the detection signal DETB changes from low level to high level, the N-type transistors TN1 and TN2 are turned on from off.

When the N-type transistors TN1 and TN2 are turned on, the terminals TCM and TSS are coupled to the ground via the N-type transistors TN1 and TN2. Therefore, a capacitor CM coupled to the terminal TCM and a capacitor CSS coupled to the terminal TSS are discharged. The capacitors CM and CSS are external components of the light emission control device 100. When the capacitors CM and CSS are discharged, the output voltage ERQ of the error amplifier circuit 124 and a voltage SS of the terminal TSS become voltages near the ground.

The P-type transistors TP2 and TP3 form a current mirror circuit, and the current flowing from the current source IBS1 is mirrored by a drain current of the P-type transistor TP3. When the detection signal DETB is at the high level, the P-type transistor TP1 is turned on. In this case, since the current flowing from the current source IBS1 flows through the P-type transistor TP1, the mirror current is zero.

When the detection signal DETB changes from the high level to the low level, the N-type transistors TN1 and TN2 are turned off from on.

When the detection signal DETB is at the low level, the P-type transistor TP1 and the N-type transistors TN1 and TN2 are turned off. In this case, the current flowing from the current source IBS1 is mirrored to the drain current of the P-type transistor TN3, and the mirror current charges the capacitor CSS, so that the voltage SS gradually increases. When the voltage SS increases, the voltage between a base and an emitter of the bipolar transistor BPT increases, so that the bipolar transistor BPT is turned off. Therefore, the capacitor CM is charged by the output of the error amplifier circuit 124, and the output voltage ERQ of the error amplifier circuit 124 gradually increases.

Figure 13:
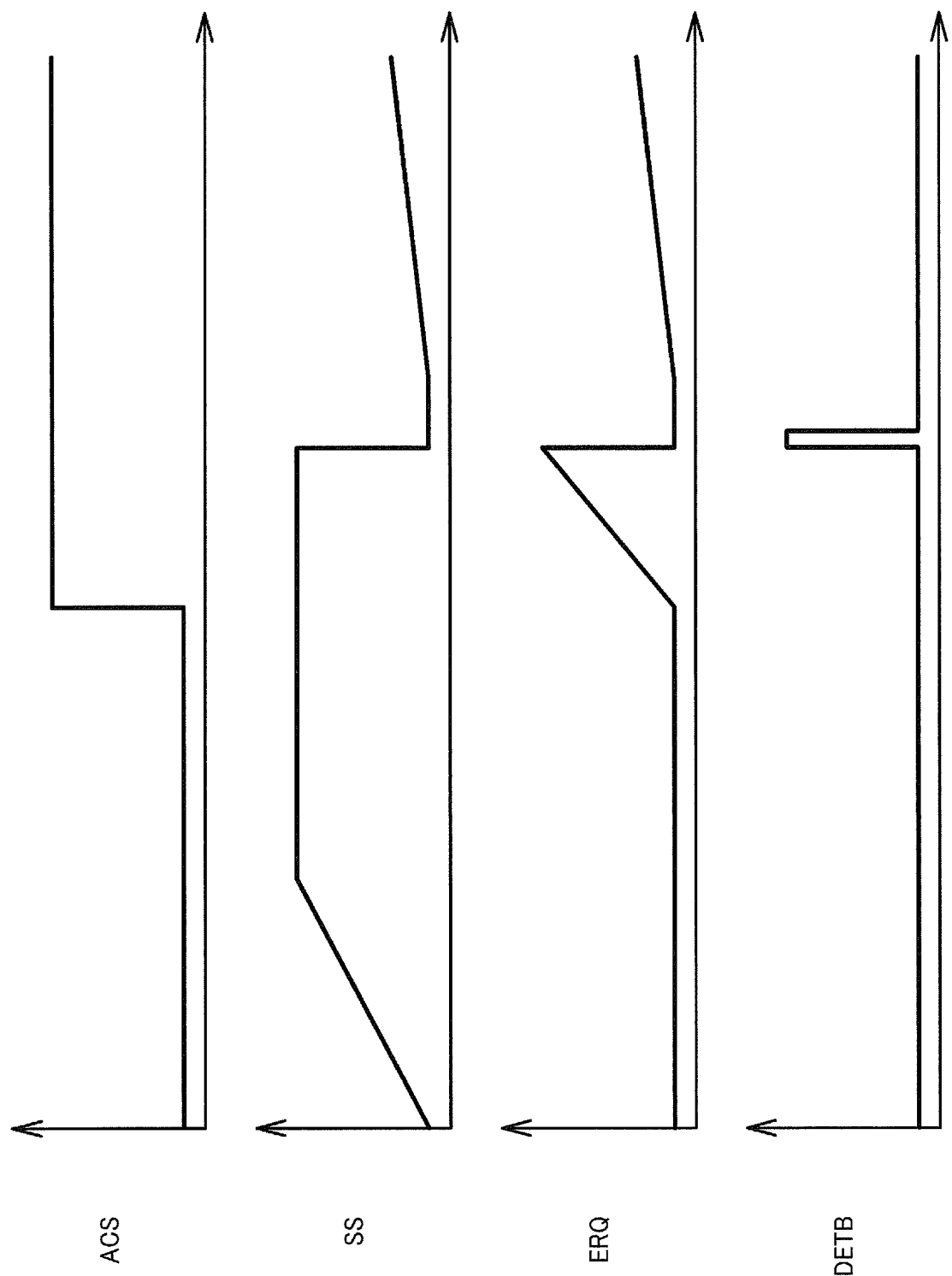
FIG. 13 is a waveform diagram when a soft start process is performed at a normal time.

FIG. 13 is a waveform diagram when the soft start process is performed at the normal time. After power is turned on to the light emission control device 100, the voltage SS increases due to soft start. In this case, it is assumed that the dimming voltage ACS is small, that is, the current ILD flowing through the light emission element 15 is small.

It is assumed that the dimming voltage ACS suddenly increases when the soft start is completed and the capacitor CSS is sufficiently charged. In this case, since the current ILD flowing through the light emission element 15 is still small, the detection voltage DTQ of the current detection circuit 123 is lower than the dimming voltage ACS. Therefore, the output voltage ERQ of the error amplifier circuit 124 increases.

When the ERQ increases, the duty of the second control signal GTB increases, so that the on-duty of the second switching element 12 increases and a large current is supplied to the inductor 14. Then, since the voltage IS at one end of the second resistor RIS increases, the detection signal DETB becomes the high level, and the restart process, that is, the soft start process is executed.

As described above, the restart process may be executed at least once at the normal time when the both ends of the first resistor RCS are not short-circuited.

5. Projection-Type Video Display Apparatus

Figure 14:
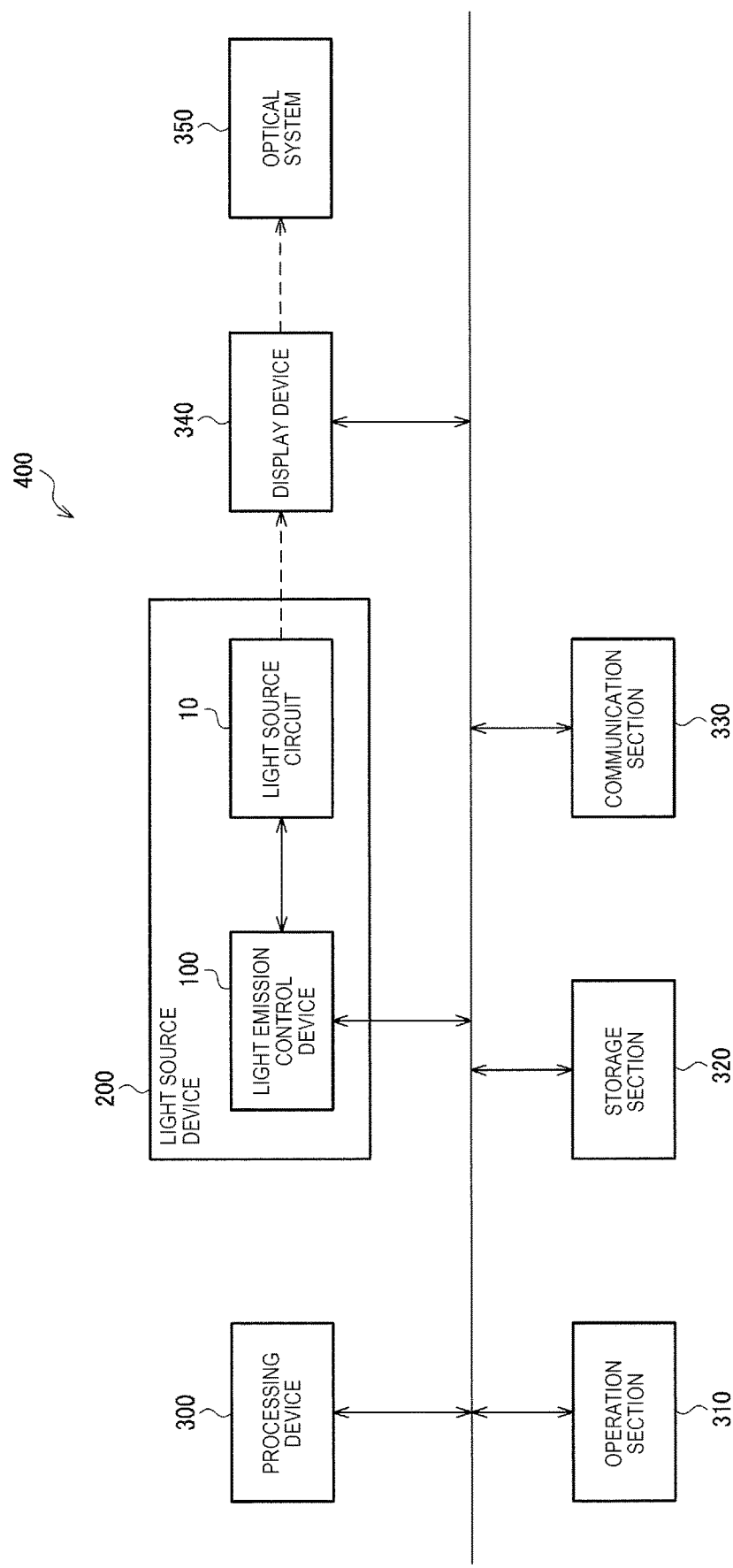
FIG. 14 is a configuration example of a projection-type video display apparatus.

FIG. 14 is a configuration example of a projection-type video display apparatus 400 including the light source device 200. The projection-type video display apparatus 400 is an apparatus that projects a video on a screen, and is also called a projector. The projection-type video display apparatus 400 includes the light source device 200, a processing device 300, an operation section 310, a storage section 320, a communication section 330, a display device 340, and an optical system 350. The light source device 200 includes the light emission control device 100 and the light source circuit 10.

The communication section 330 performs communication with an information processing device such as a PC. The communication section 330 is various video interfaces such as a VGA standard, a DVI standard, and an HDMI (HDMI is a registered trademark) standard. Alternatively, the communication section 330 may be a communication interface such as a USB standard or a network interface such as a LAN. The storage section 320 stores the image data input from the communication section 330. The storage section

320 may function as a working memory for the processing device 300. The storage section 320 is various storage devices such as a semiconductor memory or a hard disk drive. The operation section 310 is a user interface for the user to operate the projection-type video display apparatus 400. For example, the operation section 310 is a button, a touch panel, a pointing device, a character input device, or the like. The processing device 300 is a processor such as a CPU or a MPU. The processing device 300 transmits the image data stored in the storage section 320 to the display device 340. In addition, the processing device 300 performs dimming control by outputting a PWM signal and a dimming voltage to the light emission control device 100. The display device 340 includes a liquid crystal display panel and a display driver that displays an image on the liquid crystal display panel based on the image data. Light enters the liquid crystal panel from the light source circuit 10, and the light transmitted through the liquid crystal panel is projected onto a screen by the optical system 350. In FIG. 14, a light path is indicated by dotted arrows.

The light emission control device of the present embodiment described above controls the first switching element and the second switching element of the light source circuit. The light source circuit includes the light emission element, the first resistor, and the first switching element provided in series between the first power source node and the first node, and the inductor, the second switching element, and the second resistor provided in series between the first node and the second power source node. The light emission control device includes the first detection circuit, the second detection circuit, and the light emission control circuit. The first detection circuit detects the first potential difference that is a potential difference between the both ends of the first resistor. The second detection circuit detects the second potential difference that is a potential difference between the both ends of the second resistor. The light emission control circuit outputs the first control signal for controlling turning on/off of the first switching element and the second control signal for controlling turning on/off of the second switching element. When the first detection circuit detects that the first potential difference is smaller than the first threshold value and the second detection circuit detects that the second potential difference is larger than the second threshold value, the light emission control circuit performs the stop process of making at least one of the first control signal and the second control signal inactive.

In this way, the current flowing through the light emission element is detected based on the potential difference between the both ends of the first resistor, and the current flowing through the second switching element is detected based on the potential difference between the both ends of the second resistor. At least one of the first switching element and the second switching element is turned off based on these current detection results, so that the current flowing through the light emission element is stopped. Therefore, the overcurrent can be appropriately dealt with. Specifically, when the potential difference between the both ends of the first resistor is smaller than the first threshold value and the potential difference between the both ends of the second resistor is larger than the second threshold value, the current flowing through the light emission element is stopped. Therefore, even when the both ends of the first resistor are short-circuited, the overcurrent can be appropriately prevented.

In the present embodiment, the light emission control circuit may perform the restart process of increasing a current flowing through the second switching element after stopping the current, when the second detection circuit detects that the second potential difference is larger than the second threshold value.

At the normal time when the both ends of the first resistor are not short-circuited, the potential difference between the both ends of the second resistor may be larger than the second threshold value. When it is detected that the potential difference between the both ends of the second resistor is larger than the second threshold value, the restart process is performed, so that it is possible to return to the normal switching regulation control while suppressing the overcurrent at the normal time.

In the present embodiment, the light emission control circuit may perform the stop process after the restart process.

When the both ends of the first resistor are short-circuited, the overcurrent flows again through the second switching element even if the restart process is executed. According to the present embodiment, since the stop process is performed after the restart process, the overcurrent can be appropriately stopped when the both ends of the first resistor are short-circuited while suppressing the execution of the stop process at the normal time.

In the present embodiment, the light emission control circuit may perform the stop process when the first detection circuit detects that the first potential difference is smaller than the first threshold value and the second detection circuit detects that the second potential difference is larger than the second threshold value, after the restart process.

When the both ends of the first resistor are short-circuited, even if the restart process is executed, the first potential difference is smaller than the first threshold value and the second potential difference is larger than the second threshold value, again. When such a state is detected, the stop process is performed, and thereby the overcurrent can be appropriately stopped when the both ends of the first resistor are short-circuited while suppressing the execution of the stop process at the normal time.

In the present embodiment, the light emission control circuit may perform the stop process when the restart process is performed a predetermined number of times of twice or more.

When the both ends of the first resistor are short-circuited, even if the restart process is executed, the overcurrent flows again through the second switching element, so that the restart process is repeated. On the other hand, the restart process may be performed at least once at the normal time. According to the present embodiment, since the stop process is performed when the restart process is performed a predetermined number of times of 2 or more, the overcurrent can be appropriately stopped when the both ends of the first resistor are short-circuited while preventing the stop process from being executed at the normal time.

In the present embodiment, the light emission control circuit may determine that the both ends of the first resistor are short-circuited, when the first detection circuit detects that the first potential difference is smaller than the first threshold value, and the second detection circuit detects that the second potential difference is larger than the second threshold value.

In this way, it is possible to determine that the both ends of the first resistor are short-circuited by using a combination of the detection result of the current flowing through the light emission element and the detection result of the current flowing through the second switching element.

In the present embodiment, the light emission control circuit may determine that the overcurrent has flowed through the light emission element, when the first detection circuit detects that the first potential difference is larger than the third threshold value.

In this way, it is possible to detect that the overcurrent has flowed through the light emission element at the normal time when the both ends of the first resistor are not short-circuited.

In the present embodiment, the light emission control circuit may determine that the overcurrent has flowed through the second switching element, when the second detection circuit detects that the second potential difference is larger than the second threshold value.

In this way, it is possible to determine whether or not the overcurrent has flowed through the second switching element both at the time when the both ends of the first resistor are short-circuited and at the normal time when the both ends of the first resistor are not short-circuited.

In the present embodiment, the light emission control circuit may include the current detection circuit that detects the current flowing through the light emission element based on the first potential difference. The first detection circuit may detect the first potential difference based on the current detection result of the current detection circuit. The light emission control circuit may perform the PWM control on the second control signal based on the current detection result and the second potential difference.

In this way, the switching regulation control of the current flowing through the light emission element can be performed based on the detection result of the current flowing through the light emission element and the detection result of the current flowing through the second switching element. Therefore, the overcurrent can be appropriately dealt with using these two current detection results.

In the present embodiment, the light source device includes any one of the light emission control devices described above and the light source circuit.

In the present embodiment, the first resistor may be coupled between the first power source node and one end of the light emission element. The first switching element may be coupled between the other end of the light emission element and one end of the inductor. The second switching element may be coupled between the other end of the inductor and one end of the second resistor. The other end of the second resistor may be coupled to the second power source node.

The projection-type video display apparatus according to the present embodiment includes any one of the light source devices described above and the processing device that controls the light source device.

Although the present embodiments have been described in detail above, it will be easily understood by those skilled in the art that many modified examples can be made without departing from the novel matters and effects of the present disclosure. Accordingly, all such modified examples are intended to be included within the scope of the present disclosure. For example, a term described at least once together with a different term having a broader meaning or the same meaning in the specification or the drawings can be replaced with a different term anywhere in the specification or the drawings. All combinations of the present embodiment and the modified examples are also included in the scope of the present disclosure. Further, the configurations and operations of the light emission control circuit, the light emission control device, the light source circuit, the light source device, and the projection-type video display apparatus are not limited to those described in the present embodiments, and various modifications can be made.

What is claimed is:

1. A light emission control device for controlling a first switching element and a second switching element of a light source circuit including a light emission element, a first resistor, and the first switching element provided in series between a first power source node and a first node, and an inductor, the second switching element, and a second resistor provided in series between the first node and a second power source node, the light emission control device comprising:
   a first detection circuit detecting a first potential difference that is a potential difference between both ends of the first resistor;
   a second detection circuit detecting a second potential difference that is a potential difference between both ends of the second resistor; and
   a light emission control circuit outputting a first control signal for controlling turning on/off of the first switching element and a second control signal for controlling turning on/off of the second switching element, wherein
   the light emission control circuit performs a stop process of making at least one of the first control signal and the second control signal inactive, when the first detection circuit detects that the first potential difference is smaller than a first threshold value and the second detection circuit detects that the second potential difference is larger than a second threshold value.

2. The light emission control device according to claim 1, wherein
   the light emission control circuit performs a restart process of increasing a current flowing through the second switching element after stopping the current, when the second detection circuit detects that the second potential difference is larger than the second threshold value.

3. The light emission control device according to claim 2, wherein
   the light emission control circuit performs the stop process after the restart process.

4. The light emission control device according to claim 3, wherein
   the light emission control circuit performs the stop process, when the first detection circuit detects that the first potential difference is smaller than the first threshold value and the second detection circuit detects that the second potential difference is larger than the second threshold value, after the restart process.

5. The light emission control device according to claim 3, wherein
   the light emission control circuit performs the stop process when the restart process is performed a predetermined number of times of twice or more.

6. The light emission control device according to claim 1, wherein
   the light emission control circuit determines that both ends of the first resistor are short-circuited, when the first detection circuit detects that the first potential difference is smaller than the first threshold value, and the second detection circuit detects that the second potential difference is larger than the second threshold value.

7. The light emission control device according to claim 1, wherein
   the light emission control circuit determines that an overcurrent flows through the light emission element, when the first detection circuit detects that the first potential difference is larger than a third threshold value.

8. The light emission control device according to claim 1, wherein
the light emission control circuit determines that an overcurrent flows through the second switching element, when the second detection circuit detects that the second potential difference is larger than the second threshold value.

9. The light emission control device according to claim 1, wherein
the light emission control circuit includes a current detection circuit detecting a current flowing through the light emission element based on the first potential difference,
the first detection circuit detects the first potential difference based on a current detection result of the current detection circuit, and
the light emission control circuit performs PWM control on the second control signal based on the current detection result and the second potential difference.

10. A light source device comprising:
the light emission control device according to claim 1; and
the light source circuit.

11. The light source device according to claim 10, wherein
the first resistor is coupled between the first power source node and one end of the light emission element,
the first switching element is coupled between the other end of the light emission element and one end of the inductor,
the second switching element is coupled between the other end of the inductor and one end of the second resistor, and
the other end of the second resistor is coupled to the second power source node.

12. A projection-type video display apparatus comprising:
the light source device according to claim 10; and
a processing device that controls the light source device.

13. A light emission control device for controlling a first switching element and a second switching element of a light source, the light source including a light emission element, a first resistor, and the first switching element provided in series between a first power source node and a first node, and an inductor, the second switching element, and a second resistor provided in series between the first node and a second power source node, the light emission control device comprising:
a first detection circuit detecting a first potential difference that is difference between a potential of one end of the first transistor and a potential of another end of the first transistor;
a second detection circuit detecting a second potential difference that is difference between a potential of one end of the second transistor and a potential of another end of the second transistor; and
a light emission control circuit outputting a first control signal for controlling the first switching element and a second control signal for controlling the second switching element, wherein
the light emission control circuit performs a stop process of making at least one of the first control signal and the second control signal inactive, when the first detection circuit detects that the first potential difference is smaller than a first threshold value and the second detection circuit detects that the second potential difference is larger than a second threshold value.

* * * * *